(12) United States Patent
Christmas et al.

(10) Patent No.: US 10,763,630 B2
(45) Date of Patent: Sep. 1, 2020

(54) PORTABLE ELECTRONIC DEVICE CONNECTION SYSTEMS

(71) Applicant: Fasetto, Inc., Superior, WI (US)

(72) Inventors: Coy Christmas, Superior, WI (US);
Luke Malpass, Stoke-on-Trent (GB);
Erik Jones, Ladera Ranch, CA (US)

(73) Assignee: FASETTO, INC., Scottsdale, AZ (US)

( * ) Notice: Subject to any disclaimer, the term of this patent is extended or adjusted under 35 U.S.C. 154(b) by 0 days.

(21) Appl. No.: 16/164,468

(22) Filed: Oct. 18, 2018

(65) Prior Publication Data

US 2019/0123501 A1    Apr. 25, 2019

Related U.S. Application Data

(60) Provisional application No. 62/574,594, filed on Oct. 19, 2017.

(51) Int. Cl.
| | | |
|---|---|---|
| *H01R 33/90* | (2006.01) | |
| *H04M 1/02* | (2006.01) | |
| *H01R 33/76* | (2006.01) | |
| *H04B 1/3888* | (2015.01) | |
| *H01R 13/631* | (2006.01) | |

(Continued)

(52) U.S. Cl.
CPC .......... *H01R 33/90* (2013.01); *H01R 13/631* (2013.01); *H01R 33/7685* (2013.01); *H04B 1/3888* (2013.01); *H04M 1/0274* (2013.01); *H01R 13/2421* (2013.01); *H01R 13/625* (2013.01)

(58) Field of Classification Search
CPC .. H01R 33/90; H01R 13/631; H01R 33/7685; H01R 13/625; H01R 13/2421; H04B 1/3888; H04M 1/0274; H04M 1/0254; H04M 1/0249; H04M 1/72575
See application file for complete search history.

(56) References Cited

U.S. PATENT DOCUMENTS

| | | |
|---|---|---|
| 5,303,388 A | 4/1994 | Kreitman et al. |
| 5,664,228 A | 9/1997 | Mital |

(Continued)

FOREIGN PATENT DOCUMENTS

| | | |
|---|---|---|
| AU | 2013352236 | 11/2018 |
| CN | 103945003 | 7/2001 |

(Continued)

OTHER PUBLICATIONS

USPTO; Office Action dated Oct. 8, 2015 in U.S. Appl. No. 14/092,165.

(Continued)

*Primary Examiner* — Marcos L Torres
(74) *Attorney, Agent, or Firm* — Snell & Wilmer L.L.P.

(57) ABSTRACT

A connection system for a portable electronic device may allow for modular components to be coupled together. A primary module may comprise computing components, such as a processor, hard drive, wireless chip, battery, etc. Various secondary modules may be removably coupled to the primary module, such as batteries, charging stations, storage units, LTE hotspot devices, cover plates, cameras, virtual reality units, speakers, video screens, user interfaces, etc. The secondary modules may comprise connection posts which mate with receiving slots in the primary module to couple the primary and secondary components together.

4 Claims, 13 Drawing Sheets

(51) Int. Cl.
*H01R 13/24* (2006.01)
*H01R 13/625* (2006.01)

(56) References Cited

U.S. PATENT DOCUMENTS

| | | |
|---|---|---|
| 5,678,015 A | 10/1997 | Goh |
| 5,689,287 A | 11/1997 | Mackinlay et al. |
| 5,689,654 A | 11/1997 | Kikinis et al. |
| 5,729,471 A | 3/1998 | Jain et al. |
| 5,956,038 A | 9/1999 | Rekimoto |
| 5,963,215 A | 10/1999 | Rosenzweig |
| 5,982,295 A | 11/1999 | Goto et al. |
| 6,002,403 A | 12/1999 | Sugiyama et al. |
| 6,008,809 A | 12/1999 | Brooks |
| 6,029,183 A | 2/2000 | Jenkins et al. |
| 6,160,488 A | 12/2000 | Honda |
| 6,489,932 B1 | 12/2002 | Chitturi et al. |
| 6,497,367 B2 | 12/2002 | Conzola et al. |
| 6,581,068 B1 | 6/2003 | Bensoussan et al. |
| 6,597,358 B2 | 7/2003 | Miller |
| 6,652,170 B1 | 11/2003 | Arnold |
| 6,710,788 B1 | 3/2004 | Freach et al. |
| 6,922,815 B2 | 7/2005 | Rosen |
| 6,938,218 B1 | 8/2005 | Rosen |
| 7,054,963 B2 | 5/2006 | Betts-LaCroix et al. |
| 7,134,095 B1 | 11/2006 | Smith et al. |
| 7,149,836 B2 | 12/2006 | Yu et al. |
| 7,216,305 B1 | 5/2007 | Jaeger |
| 7,428,702 B1 | 9/2008 | Cervantes et al. |
| 7,480,872 B1 | 1/2009 | Ubillos |
| 7,516,484 B1 | 4/2009 | Arnouse |
| 7,533,408 B1 | 5/2009 | Arnouse |
| 7,725,839 B2 | 5/2010 | Michaels |
| 7,761,813 B2 | 7/2010 | Kim et al. |
| D654,931 S | 2/2012 | Lemelman et al. |
| 8,111,255 B2 | 2/2012 | Park |
| 8,117,563 B2 | 2/2012 | Ok et al. |
| 8,260,828 B2 | 9/2012 | Dijk et al. |
| 8,264,488 B2 | 9/2012 | Ueno |
| 8,386,686 B2 | 2/2013 | Lin et al. |
| 8,390,255 B1 | 3/2013 | Fathollahi |
| 8,405,502 B2 | 3/2013 | Teague |
| 8,483,758 B2 | 7/2013 | Huang |
| 8,497,859 B1 | 7/2013 | Hickman et al. |
| 8,510,680 B2 | 8/2013 | Kang et al. |
| 8,587,590 B2 | 11/2013 | Erickson et al. |
| 8,614,885 B2 | 12/2013 | Solomon et al. |
| 8,634,883 B2 * | 1/2014 | Hong ............... H01R 13/60 455/575.1 |
| 8,699,218 B2 | 4/2014 | Xu |
| 8,745,535 B2 | 6/2014 | Chaudhri et al. |
| 8,810,430 B2 | 8/2014 | Proud |
| 8,924,862 B1 | 12/2014 | Luo |
| 8,935,438 B1 | 1/2015 | Ivanchenko |
| 9,047,050 B2 | 6/2015 | Medica et al. |
| 9,178,976 B2 | 11/2015 | Djordjevic |
| 9,247,303 B2 | 1/2016 | Phang et al. |
| 9,288,295 B2 | 3/2016 | Ivanovski et al. |
| 9,360,991 B2 | 6/2016 | Celebisoy |
| 9,378,588 B2 | 6/2016 | Song |
| 9,390,082 B1 | 7/2016 | Stolte et al. |
| 9,405,435 B2 | 8/2016 | Hendricks |
| 9,437,038 B1 | 9/2016 | Costello et al. |
| 9,495,375 B2 | 11/2016 | Huang et al. |
| 9,584,402 B2 | 2/2017 | Christmas et al. |
| 9,626,341 B1 | 4/2017 | Guan et al. |
| 9,684,887 B2 | 6/2017 | Majeti et al. |
| 9,886,229 B2 | 2/2018 | Christmas et al. |
| 10,075,502 B2 | 9/2018 | Malpass |
| 10,084,688 B2 | 9/2018 | Christmas et al. |
| 10,095,873 B2 | 10/2018 | Christmas et al. |
| 10,122,483 B2 | 11/2018 | Gonzales, Jr. |
| 10,123,153 B2 | 11/2018 | Christmas et al. |
| 10,231,013 B2 | 3/2019 | Besehanic |
| 10,411,406 B1 * | 9/2019 | Hill ............... H01R 13/6315 |
| 2001/0028369 A1 | 10/2001 | Gallo et al. |
| 2001/0033654 A1 | 10/2001 | Wieser |
| 2001/0044578 A1 | 11/2001 | Ben-Haim et al. |
| 2002/0085681 A1 | 7/2002 | Jensen |
| 2002/0105529 A1 | 8/2002 | Bowser et al. |
| 2002/0105551 A1 | 8/2002 | Kamen et al. |
| 2002/0138543 A1 | 9/2002 | Teng et al. |
| 2003/0074529 A1 | 4/2003 | Crohas |
| 2003/0126272 A1 | 7/2003 | Cori et al. |
| 2003/0126335 A1 | 7/2003 | Silvester |
| 2003/0131050 A1 | 7/2003 | Vincent |
| 2003/0142136 A1 | 7/2003 | Carter et al. |
| 2003/0217097 A1 | 11/2003 | Eitel |
| 2004/0088280 A1 | 5/2004 | Koh et al. |
| 2004/0104932 A1 | 6/2004 | Brebner |
| 2004/0205091 A1 | 10/2004 | Mulcahy et al. |
| 2005/0005246 A1 | 1/2005 | Card et al. |
| 2005/0076216 A1 | 4/2005 | Nyberg |
| 2005/0097008 A1 | 5/2005 | Ehring et al. |
| 2005/0185364 A1 | 8/2005 | Bell et al. |
| 2005/0224589 A1 | 10/2005 | Park et al. |
| 2005/0237704 A1 | 10/2005 | Ceresoli |
| 2005/0271207 A1 | 12/2005 | Frey |
| 2006/0020888 A1 | 1/2006 | Kang et al. |
| 2006/0057960 A1 | 3/2006 | Tran |
| 2006/0075225 A1 | 4/2006 | Flynn et al. |
| 2006/0085741 A1 | 4/2006 | Weiner et al. |
| 2006/0090122 A1 | 4/2006 | Pyhalammi et al. |
| 2006/0112270 A1 | 5/2006 | Erez |
| 2006/0130004 A1 | 6/2006 | Hughes et al. |
| 2006/0149825 A1 | 7/2006 | Kim |
| 2006/0161631 A1 | 7/2006 | Lira |
| 2006/0200518 A1 | 9/2006 | Sinclair et al. |
| 2006/0239275 A1 | 10/2006 | Zlateff et al. |
| 2006/0239375 A1 | 10/2006 | Kim et al. |
| 2006/0294386 A1 | 12/2006 | Yuval et al. |
| 2007/0050778 A1 | 3/2007 | Lee et al. |
| 2007/0120846 A1 | 5/2007 | Ok et al. |
| 2007/0130541 A1 | 6/2007 | Louch et al. |
| 2007/0158408 A1 | 7/2007 | Wang et al. |
| 2007/0160198 A1 | 7/2007 | Orsini et al. |
| 2007/0168614 A1 | 7/2007 | Jianjun et al. |
| 2007/0245048 A1 | 10/2007 | Mezet et al. |
| 2007/0271580 A1 | 11/2007 | Tischer et al. |
| 2007/0273675 A1 | 11/2007 | Wangler |
| 2007/0279852 A1 | 12/2007 | Daniel et al. |
| 2007/0282601 A1 | 12/2007 | Li |
| 2008/0024976 A1 | 1/2008 | Hardson et al. |
| 2008/0069358 A1 | 3/2008 | Yang |
| 2008/0080709 A1 | 4/2008 | Michtchenko et al. |
| 2008/0181141 A1 | 7/2008 | Krantz et al. |
| 2008/0186305 A1 | 8/2008 | Carter |
| 2008/0222238 A1 | 9/2008 | Ivanov et al. |
| 2008/0223890 A1 | 9/2008 | Tecchiolli et al. |
| 2008/0235629 A1 | 9/2008 | Porter et al. |
| 2008/0241809 A1 | 10/2008 | Ashmore et al. |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar et al. |
| 2009/0009605 A1 | 1/2009 | Ortiz |
| 2009/0089692 A1 | 4/2009 | Morris |
| 2009/0116445 A1 | 5/2009 | Samar et al. |
| 2009/0144653 A1 | 6/2009 | Ubillos |
| 2009/0146775 A1 | 6/2009 | Bonnaud et al. |
| 2009/0239468 A1 | 9/2009 | He et al. |
| 2009/0240598 A1 | 12/2009 | Kargman |
| 2009/0300025 A1 | 12/2009 | Rothschild et al. |
| 2010/0007768 A1 | 1/2010 | Yong et al. |
| 2010/0020035 A1 | 1/2010 | Ryu et al. |
| 2010/0050129 A1 | 2/2010 | Li et al. |
| 2010/0078343 A1 | 4/2010 | Hoellwarth et al. |
| 2010/0088634 A1 | 4/2010 | Tsuruta et al. |
| 2010/0093412 A1 | 4/2010 | Serra et al. |
| 2010/0122207 A1 | 5/2010 | Kim et al. |
| 2010/0153449 A1 | 6/2010 | Baba et al. |
| 2010/0161743 A1 | 6/2010 | Krishnamurthi et al. |
| 2010/0169639 A1 | 7/2010 | Jeffries et al. |
| 2010/0169836 A1 | 7/2010 | Stallings et al. |

(56) References Cited

U.S. PATENT DOCUMENTS

| | | |
|---|---|---|
| 2010/0225735 A1 | 9/2010 | Shaffer et al. |
| 2010/0238089 A1 | 9/2010 | Massand |
| 2010/0256624 A1 | 10/2010 | Brannon et al. |
| 2010/0268929 A1 | 10/2010 | Fumiyoshi |
| 2010/0281138 A1 | 11/2010 | Froimchuk et al. |
| 2010/0309228 A1 | 12/2010 | Mattos et al. |
| 2010/0313154 A1 | 12/2010 | Choi et al. |
| 2010/0315225 A1 | 12/2010 | Harrison et al. |
| 2010/0315417 A1 | 12/2010 | Cho et al. |
| 2011/0051642 A1 | 3/2011 | Krishnaswamy |
| 2011/0063211 A1 | 3/2011 | Hoerl et al. |
| 2011/0090534 A1 | 4/2011 | Terao et al. |
| 2011/0107269 A1 | 5/2011 | Chiu et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0138175 A1 | 6/2011 | Clark et al. |
| 2011/0179368 A1 | 7/2011 | King et al. |
| 2011/0252098 A1 | 10/2011 | Kumar |
| 2011/0283208 A1 | 11/2011 | Gallo |
| 2011/0287808 A1 | 11/2011 | Huang |
| 2011/0294474 A1 | 12/2011 | Barany et al. |
| 2011/0295392 A1 | 12/2011 | Cunnington |
| 2011/0296339 A1 | 12/2011 | Kang |
| 2011/0310100 A1 | 12/2011 | Adimatyam et al. |
| 2012/0011200 A1 | 1/2012 | Zhang et al. |
| 2012/0034897 A1 | 2/2012 | Kreitzer et al. |
| 2012/0047517 A1 | 2/2012 | Townsend et al. |
| 2012/0098754 A1 | 4/2012 | Kim |
| 2012/0128172 A1 | 5/2012 | Alden |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1 | 8/2012 | Mandel et al. |
| 2012/0209630 A1 | 8/2012 | Ihm et al. |
| 2012/0242845 A1 | 9/2012 | Tan |
| 2012/0260218 A1 | 10/2012 | Bawel |
| 2012/0267432 A1 | 10/2012 | Kuttuva |
| 2012/0282858 A1 | 11/2012 | Gill et al. |
| 2012/0293509 A1 | 11/2012 | Barnsley |
| 2013/0028419 A1 | 1/2013 | Das et al. |
| 2013/0050117 A1 | 2/2013 | Cho et al. |
| 2013/0073692 A1 | 3/2013 | Isaza et al. |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0111038 A1 | 5/2013 | Girard |
| 2013/0125000 A1 | 5/2013 | Fleischhauer et al. |
| 2013/0145384 A1 | 6/2013 | Krum |
| 2013/0152113 A1 | 6/2013 | Conrad et al. |
| 2013/0159080 A1 | 6/2013 | Wu et al. |
| 2013/0159178 A1 | 6/2013 | Colon et al. |
| 2013/0163195 A1 | 6/2013 | Pelletier |
| 2013/0173798 A1 | 7/2013 | Micucci |
| 2013/0201176 A1 | 8/2013 | Lee et al. |
| 2013/0205277 A1 | 8/2013 | Seven et al. |
| 2013/0212112 A1 | 8/2013 | Blom et al. |
| 2013/0217448 A1* | 8/2013 | Kim .................. H04M 1/0254 455/575.1 |
| 2013/0219479 A1 | 8/2013 | Desoto et al. |
| 2013/0227420 A1 | 8/2013 | Pasquero et al. |
| 2013/0235037 A1 | 9/2013 | Baldwin et al. |
| 2013/0238711 A1 | 9/2013 | Lashkari et al. |
| 2013/0256403 A1 | 10/2013 | Mackinnon |
| 2013/0260819 A1 | 10/2013 | Suzuki et al. |
| 2013/0266065 A1 | 10/2013 | Paczkowski |
| 2013/0266129 A1 | 10/2013 | Pattan et al. |
| 2013/0268802 A1 | 10/2013 | Ito et al. |
| 2013/0268955 A1 | 10/2013 | Conrad |
| 2013/0272196 A1 | 10/2013 | Li et al. |
| 2013/0273983 A1 | 10/2013 | Hsu |
| 2013/0290440 A1 | 10/2013 | Pratt et al. |
| 2013/0300740 A1 | 11/2013 | Snyder et al. |
| 2013/0303160 A1 | 11/2013 | Fong et al. |
| 2013/0317835 A1 | 11/2013 | Matthew |
| 2013/0346911 A1 | 12/2013 | Sripada |
| 2014/0012913 A1 | 1/2014 | Varoglu et al. |
| 2014/0026204 A1 | 1/2014 | Buntinx et al. |
| 2014/0039804 A1 | 2/2014 | Park et al. |
| 2014/0040777 A1 | 2/2014 | Jones et al. |
| 2014/0052522 A1 | 2/2014 | Irani et al. |
| 2014/0052618 A1 | 2/2014 | Drozd et al. |
| 2014/0055822 A1 | 2/2014 | Hannaway et al. |
| 2014/0078136 A1 | 3/2014 | Sohn et al. |
| 2014/0082547 A1 | 3/2014 | Ding |
| 2014/0106677 A1 | 4/2014 | Altman |
| 2014/0123033 A1 | 5/2014 | Uhma et al. |
| 2014/0132594 A1 | 5/2014 | Gharpure et al. |
| 2014/0132736 A1 | 5/2014 | Chang et al. |
| 2014/0136429 A1 | 5/2014 | Psihos |
| 2014/0141713 A1 | 5/2014 | Shirinfar et al. |
| 2014/0156725 A1 | 6/2014 | Mandyam |
| 2014/0189532 A1 | 7/2014 | Sivaraman et al. |
| 2014/0207657 A1 | 7/2014 | Gacs et al. |
| 2014/0218356 A1 | 8/2014 | Distler |
| 2014/0232817 A1 | 8/2014 | Jones et al. |
| 2014/0258938 A1 | 9/2014 | Christmas et al. |
| 2014/0337640 A1 | 11/2014 | Sharma et al. |
| 2014/0351181 A1 | 11/2014 | Canoy et al. |
| 2014/0355761 A1 | 12/2014 | Kawamura et al. |
| 2015/0009531 A1 | 1/2015 | Kawaguchi |
| 2015/0012617 A1 | 1/2015 | Park et al. |
| 2015/0019628 A1 | 1/2015 | Li |
| 2015/0095777 A1 | 4/2015 | Lim et al. |
| 2015/0101018 A1 | 4/2015 | Forte |
| 2015/0106837 A1 | 4/2015 | Li et al. |
| 2015/0133000 A1* | 5/2015 | Kim .................. H01R 13/2421 439/700 |
| 2015/0145889 A1 | 5/2015 | Hanai |
| 2015/0194833 A1 | 7/2015 | Fathollahi et al. |
| 2015/0271271 A1 | 9/2015 | Bullota et al. |
| 2015/0271299 A1 | 9/2015 | Bullota et al. |
| 2015/0279470 A1 | 10/2015 | Cerrelli et al. |
| 2015/0281439 A1 | 10/2015 | Dudai |
| 2015/0339867 A1 | 11/2015 | Amon |
| 2015/0367230 A1 | 12/2015 | Bradford et al. |
| 2015/0382169 A1 | 12/2015 | Burba |
| 2016/0014574 A1 | 1/2016 | Christmas et al. |
| 2016/0037055 A1 | 2/2016 | Waddington |
| 2016/0100279 A1 | 4/2016 | Christmas et al. |
| 2016/0134941 A1 | 5/2016 | Selvaraj |
| 2016/0162244 A1 | 6/2016 | Christmas et al. |
| 2016/0188468 A1 | 6/2016 | Rao |
| 2016/0195899 A1* | 7/2016 | Plante .................. G06F 1/1632 361/679.43 |
| 2016/0226730 A1 | 8/2016 | Schumacher |
| 2016/0260319 A1 | 9/2016 | Jeffery et al. |
| 2016/0269468 A1 | 9/2016 | Malpass |
| 2017/0134803 A1 | 5/2017 | Shaw |
| 2017/0160992 A1 | 6/2017 | Christmas et al. |
| 2017/0371378 A1 | 12/2017 | Christmas et al. |
| 2018/0146378 A1 | 5/2018 | Christmas et al. |
| 2019/0007477 A1 | 1/2019 | Malpass |
| 2019/0012473 A1 | 1/2019 | Christmas et al. |
| 2019/0020576 A1 | 1/2019 | Christmas et al. |
| 2019/0037381 A1 | 1/2019 | Christmas et al. |
| 2019/0319993 A1 | 10/2019 | Christmas |
| 2020/0010049 A1 | 1/2020 | Christmas |

FOREIGN PATENT DOCUMENTS

| | | |
|---|---|---|
| CN | 1881164 | 12/2006 |
| CN | 101388815 | 3/2009 |
| CN | 101401341 | 4/2009 |
| CN | 102376133 | 3/2012 |
| CN | 102591571 A | 7/2012 |
| CN | 103077462 | 5/2013 |
| CN | 103095852 | 5/2013 |
| CN | 103546181 A | 1/2014 |
| CN | 106797337 | 5/2018 |
| CN | 105706033 | 5/2019 |
| EP | 0800144 A2 | 10/1997 |
| EP | 1168769 A2 | 2/2002 |
| EP | 1761048 A2 | 3/2007 |

(56) References Cited

FOREIGN PATENT DOCUMENTS

| | | |
|---|---|---|
| EP | 1806649 A1 | 7/2007 |
| EP | 3022638 | 4/2018 |
| HK | 1242492 | 6/2018 |
| JP | 09-091155 | 4/1997 |
| JP | 2007-049606 | 2/2007 |
| JP | 2010-535351 | 11/2010 |
| JP | 2011-134159 | 7/2011 |
| JP | 2011-147136 | 7/2011 |
| JP | 2011-248489 | 12/2011 |
| JP | 2013-214801 | 10/2013 |
| JP | 6310477 | 4/2018 |
| JP | 2018-514845 | 6/2018 |
| JP | 6479026 | 2/2019 |
| KR | 10-2004-0108122 | 12/2004 |
| KR | 10-2005-0098078 | 10/2005 |
| KR | 10-20090059672 | 6/2009 |
| KR | 10-20100056594 | 5/2010 |
| KR | 10-20120092487 A | 8/2012 |
| KR | 10-2012-0059488 | 5/2013 |
| KR | 10-2017-0047866 | 5/2017 |
| RU | 2421800 | 6/2011 |
| TW | 201214150 | 4/2012 |
| TW | 201320681 | 5/2013 |
| TW | 201349811 | 12/2013 |
| TW | 629910 | 7/2018 |
| WO | 2000033545 | 6/2000 |
| WO | 2005050393 | 6/2005 |
| WO | 2006107324 | 10/2006 |
| WO | 2006125027 | 11/2006 |
| WO | 2007076494 A2 | 7/2007 |
| WO | 2007103908 A2 | 9/2007 |
| WO | 2008090902 | 7/2008 |
| WO | 2009016612 | 2/2009 |
| WO | 2010018551 | 8/2010 |
| WO | 2012087847 A2 | 6/2012 |
| WO | 2014012486 | 1/2014 |
| WO | 2014016622 | 1/2014 |
| WO | 2014085502 | 6/2014 |
| WO | 2014138187 | 9/2014 |
| WO | 2014141235 | 9/2014 |
| WO | 2014151925 A1 | 9/2014 |
| WO | 2015009944 | 1/2015 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |
| WO | 2018098313 | 5/2018 |
| WO | 2018144833 | 8/2018 |
| WO | 2018232186 | 12/2018 |
| WO | 2019079628 | 4/2019 |

OTHER PUBLICATIONS

USPTO; Office Action dated Sep. 18, 2015 in U.S. Appl. No. 14/164,919.
USPTO; Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Office action dated Apr. 22, 2016 in U.S. Appl. No. 14/709,231.
USPTO; Notice of Allowance dated Aug. 16, 2016 in U.S. Appl. No. 14/092,165.
USPTO; Office Action dated Oct. 6, 2016 in U.S. Appl. No. 14/197,517.
USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated Nov. 25, 2016 in U.S. Appl. No. 14/795,210.
USPTO; Office Action dated Apr. 7, 2017 in U.S. Appl. No. 14/500,363.
USPTO; Office Action dated Apr. 14, 2017 in U.S. Appl. No. 14/905,639.
USPTO; Office Action dated Apr. 6, 2017 in U.S. Appl. No. 14/709,231.
USPTO; Office Action dated May 4, 2017 in U.S. Appl. No. 14/745,100.
USPTO; Final Office Action dated Jun. 30, 2017 in U.S. Appl. No. 14/197,517.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Oct. 3, 2017 in U.S. Appl. No. 14/500,363.
USPTO; Final Office action dated Sep. 29, 2017 in U.S. Appl. No. 14/709,231.
USPTO; Office Action dated Oct. 25, 2017 in U.S. Appl. No. 15/435,884.
USPTO; Final Office Action dated Oct. 13, 2017 in U.S. Appl. No. 14/745,100.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Non-Final Office Action dated Jan. 8, 2018 in U.S. Appl. No. 15/065,713.
USPTO; Notice of Allowance dated Feb. 26, 2018 in U.S. Appl. No. 14/745,100.
USPTO; Non-Final Office Action dated Mar. 8, 2018 in U.S. Appl. No. 14/197,517.
USPTO; Notice of Allowance dated May 7, 2018 in U.S. Appl. No. 15/065,713.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.
USPTO; Notice of Allowance dated May 29, 2018 in U.S. Appl. No. 15/065,713.
USPTO; Notice of Allowance dated Jun. 20, 2018 in U.S. Appl. No. 15/435,884.
USPTO; Non-Final Office Action dated Jun. 28, 2018 in U.S. Appl. No. 14/795,210.
USPTO; Notice of Allowance dated Jun. 29, 2018 in U.S. Appl. No. 15/065,713.
USPTO; Notice of Allowance dated Jul. 5, 2018 in U.S. Appl. No. 14/745,100.
USPTO; Notice of Allowance dated Jul. 10, 2018 in U.S. Appl. No. 14/709,231.
USPTO; Final Office Action dated Aug. 10, 2018 in U.S. Appl. No. 15/367,961.
USPTO; Notice of Allowance dated Sep. 28, 2018 in U.S. Appl. No. 15/644,556.
USPTO; Final Office Action dated Oct. 18, 2018 in U.S. Appl. No. 14/197,517.
EP; Extended Search Report dated Sep. 17, 2015 in Application Serial No. 15740208.2.
Sweden; Office Action dated Nov. 18, 2015 in Application Serial No. 1551071-2.
EP; Supplemental Search Report dated Jun. 14, 2016 in Application Serial No. 13859205.0.

(56) References Cited

OTHER PUBLICATIONS

EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
EP; Extended Search Report dated Mar. 21, 2017 in Application Serial No. 14846886.1.
MX; Examination Report dated Feb. 24, 2017 in Application Serial No. 2015/006550.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 20138007041.5X [Assoc did not report OA Until Sep. 27, 2017].
CN; 2nd Examination Report dated Apr. 18, 2018 in Application Serial No. 201380070415.X.
CN; Examination Report dated May 9, 2018 in Application Serial No. 201480023946.8.
CN; 1st Office Action dated Nov. 20, 2018 in Application Serial No. 201580016416.5.
MX; 2nd Examination Report dated Oct. 24, 2017 in Application Serial No. 2015/011314.
MX; 3rd Examination Report dated Jul. 2, 2018 in Application No. 2015/011314 (Received on Sep. 7, 2018).
EP; Supplemental Search Report dated Sep. 15, 2017 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
TW; Notice of Allowance dated May 15, 2018 in Application Serial No. 104102514.
EP; Extended Search Report dated Apr. 9, 2018 in Application Serial No. 15848371.9.
EP; Supplementary Search Report dated Apr. 30, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Notice of Allowance dated Mar. 17, 2018 in Application Serial No. 2015-545200.
JP; Office Action dated Feb. 2, 2018 in Application Serial No. 2016-549317.
AU; 1st Office Action dated Apr. 13, 2018 in Application Serial No. 2013352236.
EP; Extended Search Report and Supplementary Search Report dated Oct. 19, 2018 in Application Serial No. 16762464.2.
AU; 1st Office Action dated Oct. 24, 2018 in Application Serial No. 2015287705.
MX; 2nd Examination Report dated Oct. 4, 2018 (Received from Mexico Counsel on Nov. 6, 2018) in Application Serial No. MX/a/2016/003798.
CN; 3rd Examination Report dated Oct. 31, 2018 in Application Serial No. CN 201380070415.
EPO; Examination Report dated Nov. 8, 2018 in Application No. EP 15740208.2.
AU; Examination Report dated Dec. 19, 2018 in Application Serial No. AU 2014225864.
PCT; International Search Report dated Jul. 4, 2014 in Application No. US2014/020624.
PCT; Written Opinion dated Jul. 4, 2014 in Application No. US2014/020624.
PCT; International Preliminary Report on Patentability dated Sep. 8, 2015 in Application No. US2014/020624.
PCT; International Search Report dated Nov. 13, 2014 in US2014/047054.
PCT; Written Opinion dated Nov. 13, 2014 in US2014/047054.
PCT; International Preliminary Report on Patentability dated Jan. 19, 2016 in US2014/047054.
PCT; International Search Report dated Jan. 6, 2015 in US2014/058126.
PCT; Written Opinion dated Jan. 6, 2015 in US2014/058126.
PCT; International Search Report dated Mar. 5, 2014 in US2013042089.
PCT; Written Opinion dated Mar. 5, 2015 in US2013/072089.
PCT; International Preliminary Report on Patentability dated Jun. 2, 2015 in US2013072089.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
PCT; International Search Report and Written Opinion dated Nov. 2, 2015 in US2015/039797.
PCT; International Preliminary Report on Patentability dated Apr. 14, 2016 in US2014/058126.
PCT; International Search Report and Written Opinion dated Jul. 11, 2016 in US2016/021627.
PCT; International Search Report and Written Opinion dated Mar. 20, 2017 in US/2016/064744.
PCT; International Search Report and Written Opinion dated Feb. 20, 2018 in US/2017/063061 received May 31, 2018.
PCT; International Search Report and Written Opinion dated Aug. 9, 2018 in International Application PCT/US2018/016610.
Kim, Young-Gon, and Moon-Seog Jun. A design of user authentication system using QR code identifying method. Computer Sciences and Convergence Information Technology (ICCIT), 6th International Conference on IEEE. Nov. 29-Dec. 1, 2011.
Application Programming Interface by David Orenstein, published Jan. 10, 2000 on Computerworld.com.
Gerd Kortuem et al., "Architectural Issues in Supporting Ad-hoc Collaboration with Wearable Computers," In: Proceedings of the Workshop on Software Engineering for Wearable and Pervasive Computing at the 22nd International Conference on Software Engineering, 2000.
3rd party observation dated Dec. 22, 2015 against Patent Application No. 1551071-2 in Sweden.
Revault Product Data Sheet dated Mar. 19, 2015.
Dusk Jockeys; Dust Jockeys Android Apps dated Mar. 7, 2012, pp. 1-5.
Sue White: Wi-Fi and Bluetooth Coexistence, Electronic Component News, Mar. 2, 2012, pp. 1-7, XP05504386, Retrieved from Internet: URL: https://www.ecnmag.com/article/2012/03/wi-fi-andbluetooth-coexistence [retrieved on Sep. 6, 2017].
"Class Persistent Manager," https://web.archive.org/web/20131110042918/https://tomcat.apache.org/tomcat-4.1-doc/catalina/docs/api/org/apache/catalina/session, 3 Pages, (Oct. 2018).
USPTO; Non-Final Office Action dated Feb. 6, 2019 in U.S. Appl. No. 15/644,556.
USPTO; Final Office Action dated Feb. 7, 2019 in U.S. Appl. No. 14/795,210.
USPTO; Non-Final Office Action dated Mar. 7, 2019 in U.S. Appl. No. 15/367,961.
USPTO; Advisory Action dated Mar. 12, 2019 in U.S. Appl. No. 14/197,517.
CN; 1st Office Action dated Nov. 26, 2018 in Application Serial No. 201480065117.6.
CN; Notice of Intent to Grant dated Feb. 11, 2019 in Application No. CN 201380070415.
EP; Notice of Intent to Grant dated Jan. 4, 2019 in Application No. EP14760041.5.
CN; Notice of Intent to Grant dated Jan. 30, 2019 in Application No. CN 201480023946.8.
EP; Examination Report dated Feb. 5, 2019 in Application No. EP 13859205.0.
JP; Notice of Allowance dated Dec. 30, 2018 in Application No. JP 2016-549317.

(56) References Cited

OTHER PUBLICATIONS

TW; Search Report dated Dec. 10, 2018 in Application No. TW 107119353.
TW; First Office Action dated Dec. 6, 2018 in Application No. TW 107119353.
EP; Examination Report dated Jan. 3, 2019 in Application No. EP 15848371.9.
PCT; International Search Report and Written Opinion dated Oct. 12, 2018 in International Application PCT/US2018/037643.
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
USPTO; Notice of Allowance dated May 21, 2019 in U.S. Appl. No. 15/644,556.
USPTO; Non-Final Office Action dated May 30, 2019 in U.S. Appl. No. 16/114,531.
USPTO; Non-Final Office Action dated Jun. 14, 2019 in U.S. Appl. No. 14/197,517.
USPTO; Restriction Requirement dated Jun. 20, 2019 in U.S. Appl. No. 16/152,342.
USPTO; Non-Final Office Action dated Sep. 30, 2019 in U.S. Appl. No. 16/152,342.
USPTO; Notice of Allowance dated Aug. 28, 2019 in the U.S. Appl. No. 15/821,212.
AU; 2nd Examination Report Mar. 20, 2019 in Application No. AU 2014225864.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
MX; Notice of Allowance dated Oct. 14, 2019 in Application No. MX/a/2016/003798.
Sweden; Office Action dated Jul. 17, 2019 in Application No. 1551071-2.
CN; Second Office Action dated Apr. 29, 2019 in Application No. 201480065117.6.
CN; Third Office Action dated Aug. 8, 2019 in Application No. 201480065117.6.
PCT; International Search Report and Written Opinion dated Feb. 12, 2019 in International Application PCT/US2019/056562.
PCT; International Preliminary Report on Patentability dated Jan. 19, 2017 in the International Application No. PCT/US2015/039797.
PCT; International Preliminary Report on Patentability dated Aug. 15, 2019 in the International Application No. PCT/US2018/016610.
PCT; International Search Report and Written Opinion dated Mar. 22, 2019 in the International Application No. PCT/US2018/063468.
PCT; International Search Report and Written Opinion dated Aug. 9, 2019 in the International Application No. PCT/US2019/027993.
USPTO; Non-Final Office Action dated Jan. 10, 2020 in the U.S. Appl. No. 16/387,464.

\* cited by examiner

PORTABLE ELECTRONIC DEVICE CONNECTION SYSTEMS

CROSS-REFERENCE TO RELATED APPLICATIONS

This application claims priority to, and the benefit of, U.S. Provisional Patent Application No. 62/574,594 filed on Oct. 19, 2017 entitled "PORTABLE ELECTRONIC DEVICE CONNECTION SYSTEMS." The content of the foregoing application is hereby incorporated by reference for all purposes.

FIELD

The present disclosure generally relates to portable electronic devices, and more particularly to systems and methods for connecting portable electronic device components together.

BACKGROUND

The use of portable and wearable electronic devices is rapidly increasing. In order to decrease size and cost of electronic devices, some devices may utilize modular components which connect together to provide different functionalities to a device. However, existing connection mechanisms tend to be cumbersome and limited in functionality.

SUMMARY

A portable electronic device may comprise a primary module comprising: a mating surface; a receiving slot located in the mating surface; and a contact pad recessed into the mating surface. The portable electronic device may comprise a secondary module configured to couple to the primary module, the secondary module comprising: a connection post configured to mate with the receiving slot; and a pin configured to contact the contact pad.

In various embodiments, the pin may be a pogo pin. The pin may comprise a plunger, a body, and a spring located within the body. The receiving slot may comprise a ramp extending from the mating surface to a recessed surface. The primary module may comprise an alignment depression in a center of the mating surface. The secondary module may comprise an alignment post in a center of the secondary module. The primary module may comprise a wireless chip. The secondary module may comprise a battery. The secondary module may be configured to couple to the primary module by inserting the connection post in the receiving slot and rotating the secondary module relative to the primary module. The secondary module may be configured to connect to an LTE network.

A modular portable electronic device system may comprise a primary module comprising a processor, a hard drive, a wireless chip, a battery, and a mating surface comprising a receiving slot. A first secondary module may comprise a first connection post, wherein the first secondary module is configured to couple to the primary module by inserting the first connection post in the receiving slot and rotating the first secondary module. A second secondary module may comprise a second connection post, wherein the second secondary module is configured to couple to the primary module by inserting the second connection post in the receiving slot and rotating the second secondary module.

In various embodiments, the first secondary module may comprise a cover plate, and the second secondary module may comprise a storage module. For example, primary module may comprise seventeen contact pads. These exemplary seventeen contact pads may be arranged in a first row of six contact pads, a second row of five contact pads, and a third row of six contact pads. The receiving slot may comprise a ramp extending from the mating surface to a recessed surface.

A modular portable electronic system may comprise a phone case comprising a battery, first pins, and a first reception cavity; a primary module configured to be inserted within the first reception cavity, wherein the primary module comprises second pins; and a phone jack configured to interface with a phone.

In various embodiments, the first pins in the phone case are configured to mate with the second pins on the primary module. The phone case may comprise wires configured to electrically connect the battery, the primary module, and the phone jack. The phone case may comprise a second reception cavity configured to receive the phone. The primary module may comprise a USB Type C port.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

Figure 1:
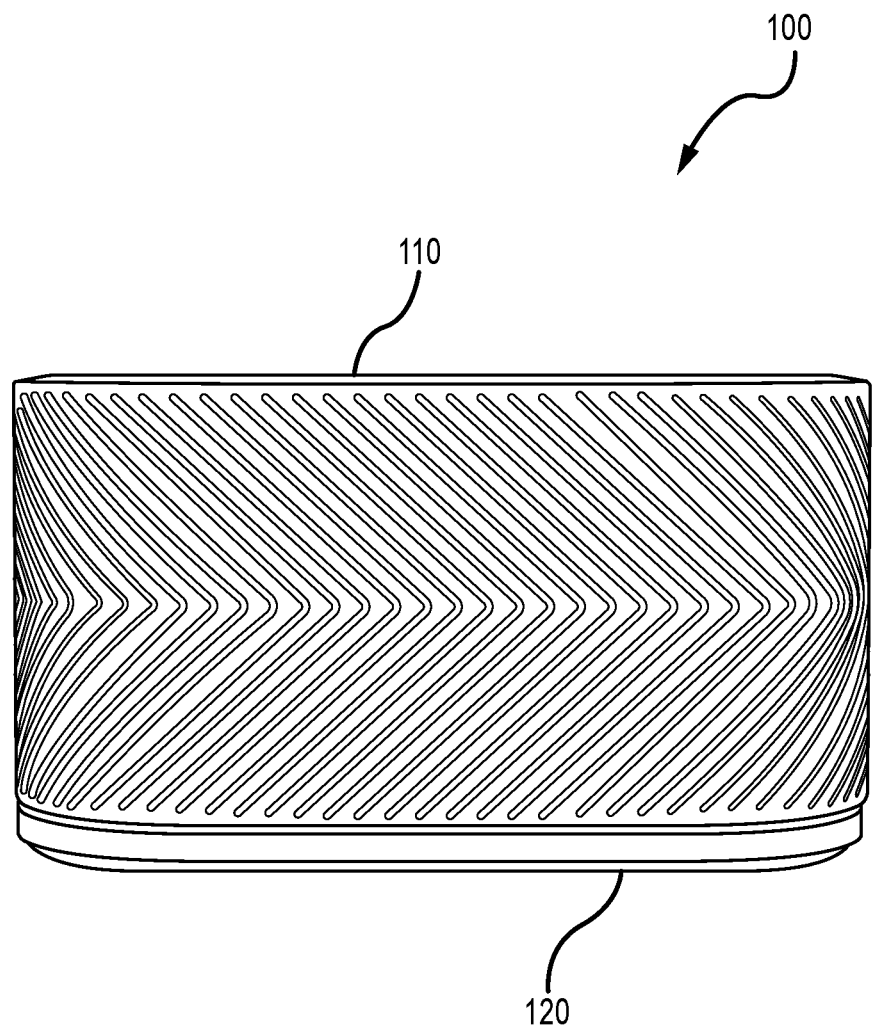
FIG. 1 illustrates a side view of a portable electronic device according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Connection systems for portable electronic device components are disclosed herein. The connection systems may allow for modular components to be coupled together. A primary module may comprise computing components, such as a processor, hard drive, wireless chip, battery, etc. Various secondary modules may be removably coupled to the primary module, such as batteries, charging stations, storage units, LTE hotspot devices, cover plates, cameras, virtual reality units, speakers, video screens, user interfaces, etc. The secondary modules may comprise connection posts which mate with receiving slots in the primary module to couple the primary and secondary components together. An alignment post on the secondary module may mate with an alignment depression in the primary module. Metallic pins on the secondary module may contact pads on the primary module to allow for the exchange of electronic signals between the primary module and the secondary module.

The primary module may wirelessly receive and transmit files and communications from other devices, such as cameras, smartphones, televisions, game consoles, tablets, personal computers, printers, etc. The primary module may communicate across platforms, such as with Apple® devices, Android® devices, Windows® devices, UNIX® devices, or any other suitable devices. In various embodiments, the primary module may allow a user to access their files wherever the user goes. For example, a user may have a document stored on a laptop computer. The user may transmit the document from the laptop computer to the primary module wirelessly. In various embodiments, the primary module may communicate directly with other devices without using a network. Thus, information may be transmitted securely between the primary module and other devices. However, in various embodiments, the primary module may communicate over a network using a wireless chip in the primary module. For more information regarding the capabilities of a primary module, see U.S. patent application Ser. No. 15/367,961 titled "SYSTEMS AND METHODS FOR MEMORY CARD EMULATION," and filed on Dec. 2, 2016, the contents of which are incorporated by reference herein in their entirety.

Referring to FIG. 1, a side view of a portable electronic device ("PED") 100 is illustrated according to various embodiments. The PED 100 may comprise a primary module 110 and a secondary module 120 coupled to the primary module 110. The PED 100 is illustrated in the locked position, in which the primary module 110 and the secondary module 120 may remain coupled together and be used together.

Figure 2:
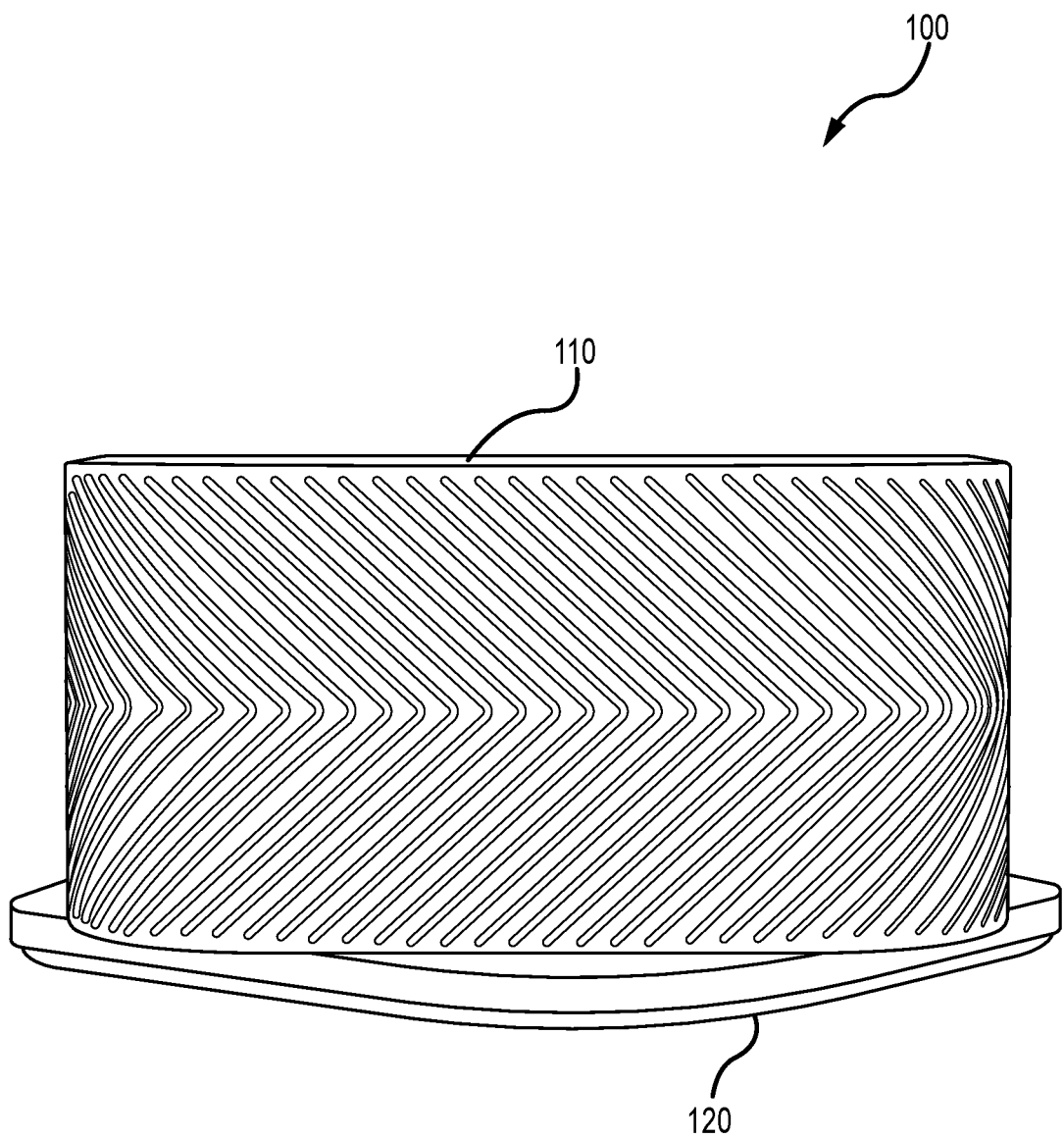
FIG. 2 illustrates a side view of the PED with the secondary module rotated with respect to the primary module according to various embodiments.

Referring to FIG. 2, a side view of the PED 100 with the secondary module 120 rotated with respect to the primary module 110 is illustrated according to various embodiments. The secondary module 120 may be rotated in order to disconnect the secondary module 120 from the primary module 110. A user may grasp the secondary module 120 and apply a torque to rotate the secondary module 120 relative to the primary module 110. The act of rotating the secondary module 120 relative to the primary module 110 may unlock the PED 100 such that the secondary module 120 may be separated from the primary module 110.

Figure 3:
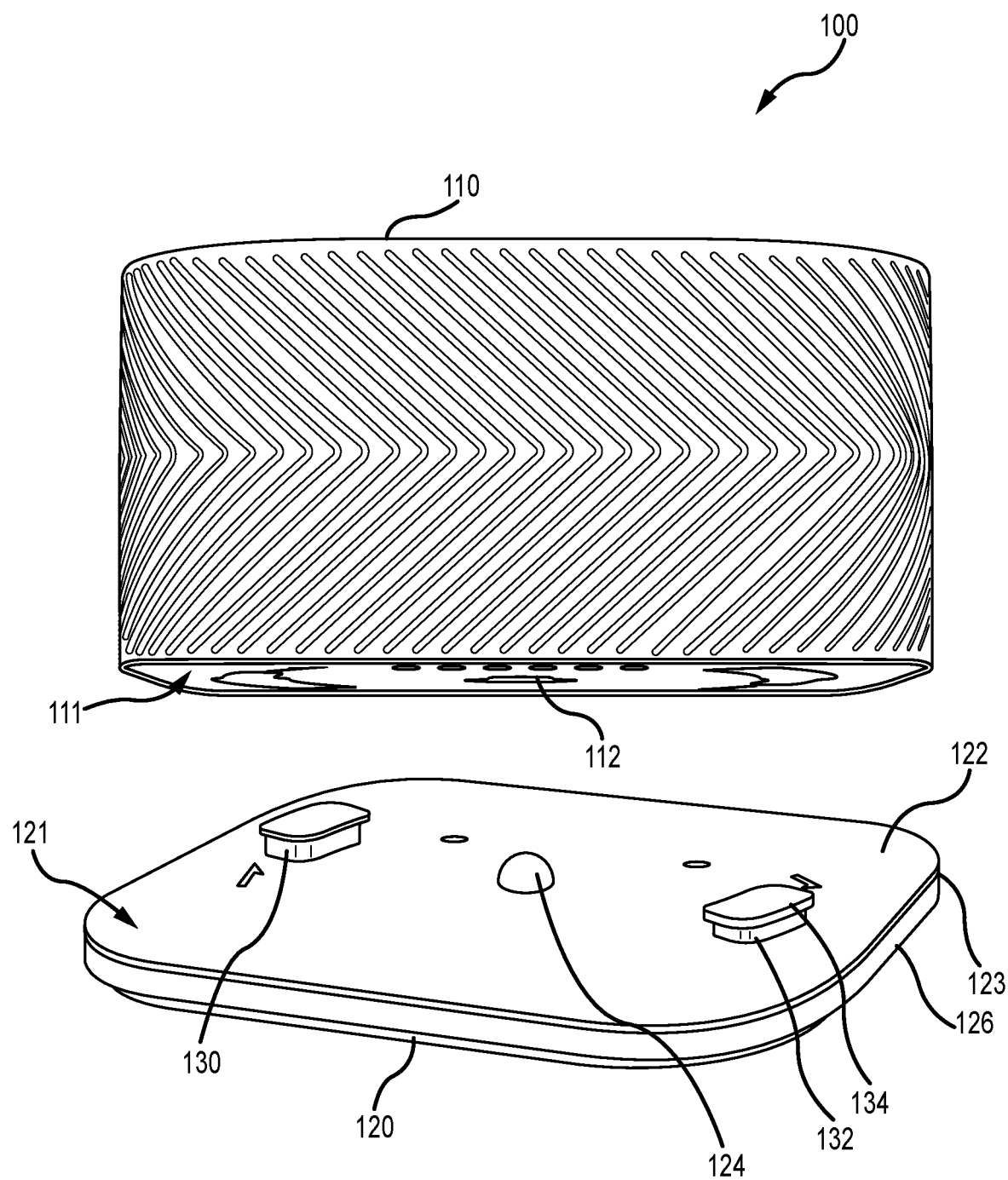
FIG. 3 illustrates a perspective view of the PED with the secondary module separated from the primary module according to various embodiments.

Referring to FIG. 3, a perspective view of the PED 100 with the secondary module 120 separated from the primary module 110 is illustrated according to various embodiments. The illustrated secondary module 120 may be a cover plate, which is intended to cover and protect various components of the primary module 110. The secondary module 120 may comprise a generally planar square baseplate 122 with rounded corners 123. The secondary module 120 may comprise an alignment post 124. In various embodiments, the alignment post 124 may comprise a portion of a sphere extending from a top surface 121 of the baseplate 122. The alignment post 124 may be located in a center of the baseplate 122. The alignment post 124 may be configured to be inserted into an alignment depression 112 in the center of a mating surface 111 of the primary module 110. The secondary module 120 may be configured to rotate about the alignment post 124 when the alignment post 124 is located within the alignment depression 112.

The secondary module 120 may comprise connection posts 130. In various embodiments, the secondary module 120 may comprise two connection posts 130. The connection posts 130 may be located between the alignment post 124 and the edge 126 of the secondary module 120. In various embodiments, the connection posts 130 may be separated by 180 degrees about the alignment post 124, such that the alignment post 124 is located at a midpoint between the two connection posts 130. However, in various embodiments, the secondary module 120 may comprise one, two, three, four, or any other suitable number of connection posts 130.

Each connection post 130 may comprise a base 132 extending from the top surface 121 of the baseplate 122. Each connection post 130 may comprise a locking plate 134 coupled to the base 132 and separated from the baseplate 122 by the base 132. The locking plate 134 may comprise a diameter greater than a diameter of the base 132. The locking plate 134 may be parallel to the baseplate 122.

Figure 4:
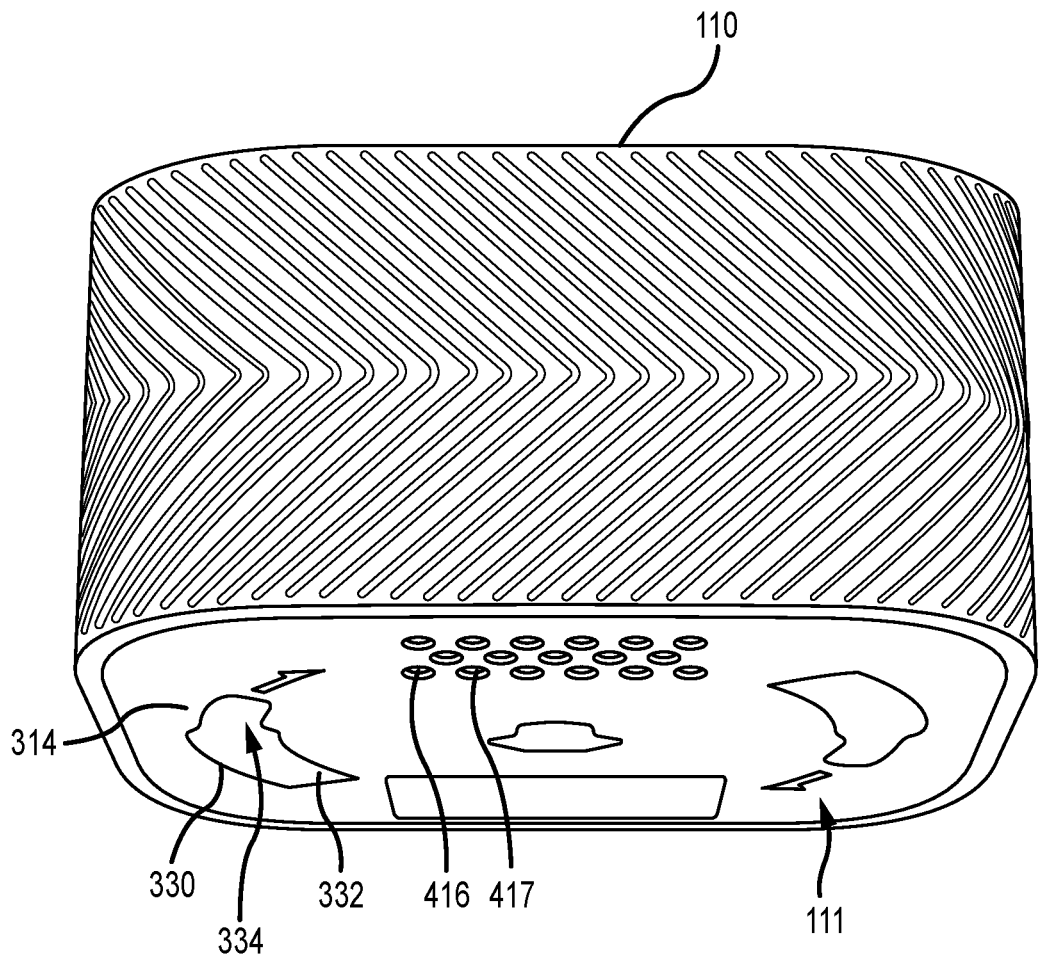
FIG. 4 illustrates a perspective view of the primary module according to various embodiments.

Referring to FIG. 4, a perspective view of the primary module 110 is illustrated according to various embodiments. The mating surface 111 of the primary module may comprise receiving slots 330. The mating surface 111 may comprise one receiving slot 330 for each connection post. In the illustrated embodiment, the mating surface 111 comprises two receiving slots 330. Each receiving slot 330 may comprise a ramp 332. The ramp 332 may extend from the mating surface 111 to a recessed surface 334 in the receiving slot 330. A width of the receiving slot 330 in the area of the ramp 332 may be greater than a width of a locking aperture 314 in the mating surface 111 in the area of the recessed surface 334. The primary module 110 may comprise contact pads 416. The contact pads 416 may comprise electrical contacts recessed from the mating surface 111 in contact pad apertures 417.

Figure 5:
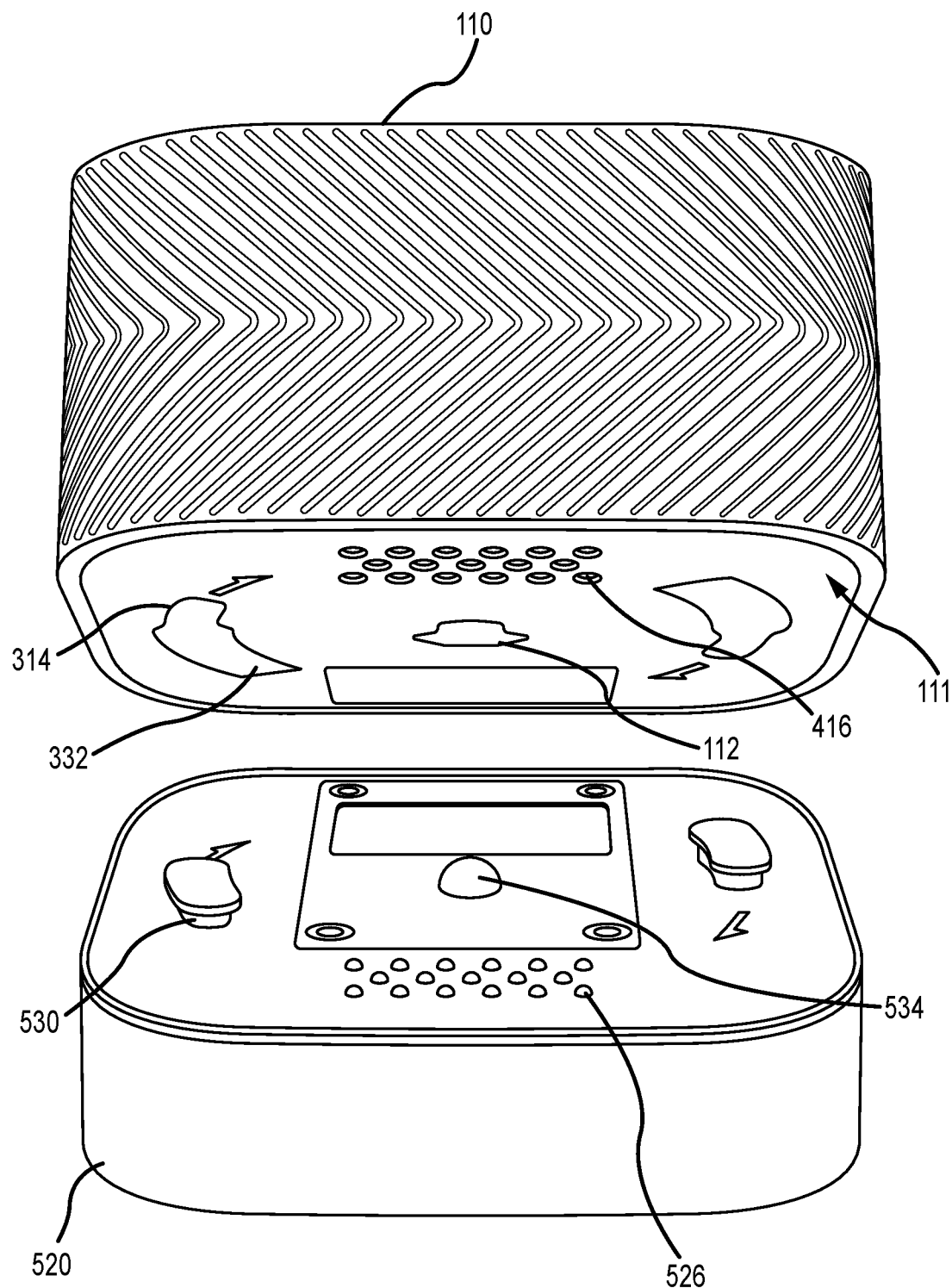
FIG. 5 illustrates a perspective view of the primary module and a secondary module according to various embodiments.

Referring to FIG. 5, a perspective view of the primary module 110 and a secondary module 520 illustrated according to various embodiments. The secondary module 520 may be a battery which provides additional battery life to the primary module 110. The secondary module 520 may comprise electronic components which may interface with the primary module 110 via pins 526. The pins 526 may be configured to contact the contact pads 416 and exchange electronic signals between the primary module 110 and the secondary module 520.

A user may couple the secondary module 520 to the primary module 110 by positioning the alignment post 534 within the alignment depression 112 in the mating surface 111 and rotating the secondary module 520 with respect to the primary module 110. As the secondary module 520 is rotated, the connection posts 530 may contact the ramps 332. The connection posts 530 may slide along the ramps 332 and into the locking apertures 314. The secondary module 520 may continue rotating until the connection posts 530 contact the edge of the locking apertures 314 and prevent further rotation.

As the connection posts 530 slide along the ramps 332 and into the primary module 110, the distance between the mating surface 111 and the secondary module 520 may decrease. The pins 526 may contact the mating surface 111. In various embodiments, the pins 526 may be pogo pins, in which a spring biases the pins 526 to project from the secondary module 520, and the pins 526 may be pressed into the secondary module 520 in response to a force on the pins 526, such as contact from the mating surface 111.

Figure 6:
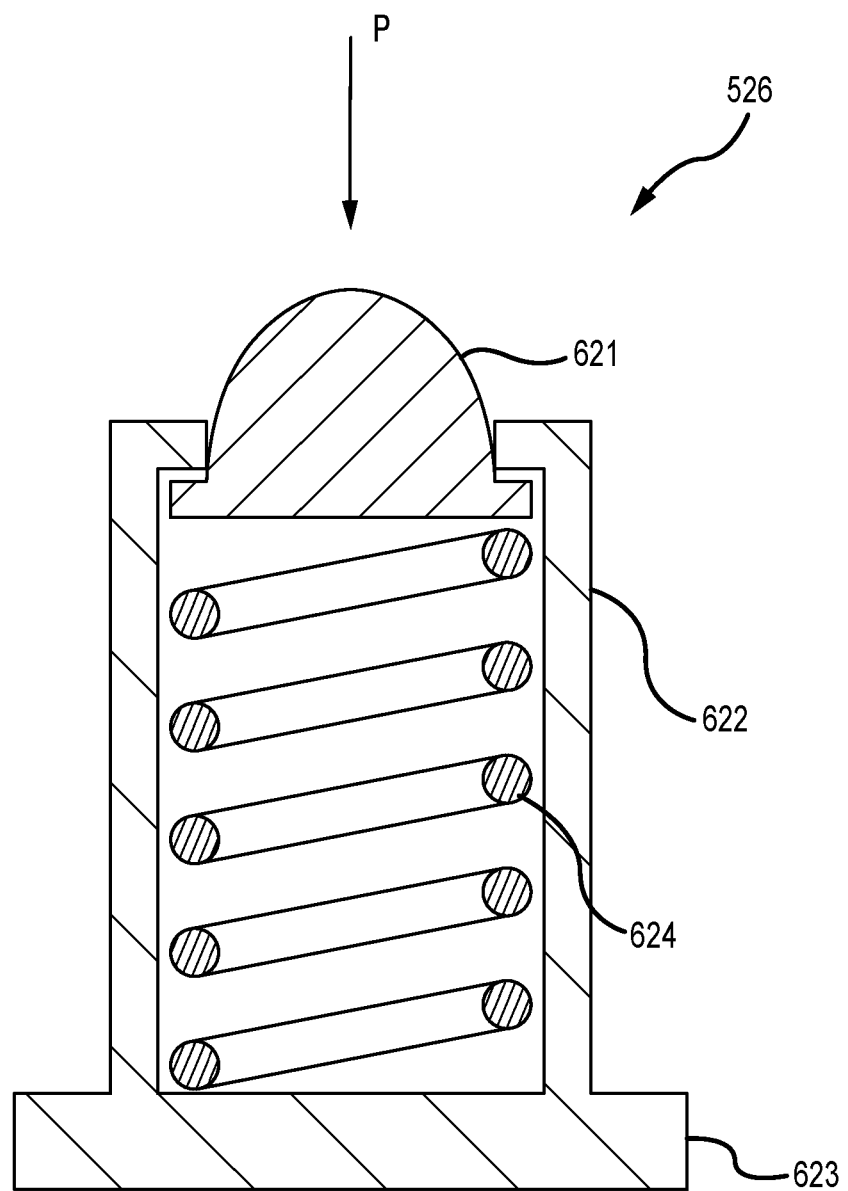
FIG. 6 illustrates a cross-section view of a pin according to various embodiments.

Referring to FIG. 6, a cross-section view of a pin 526 is illustrated according to various embodiments. The illustrated pin 526 is a pogo pin. The pin 526 may comprise a plunger 621 located at least partially within a body 622. The body 622 may comprise a hollow cylinder coupled to a base 623. The base 623 may be configured to contact a printed circuit board. The pin 526 may comprise a spring 624 located within the body 622. In response to a downward pressure (in the direction of arrow P) on the plunger 621, the plunger 621 may compress the spring 624, and the plunger 621 may retract into the body 622. In response to the pressure being removed, the spring 624 may bias the plunger 621 to project out the body 622.

Figure 7:
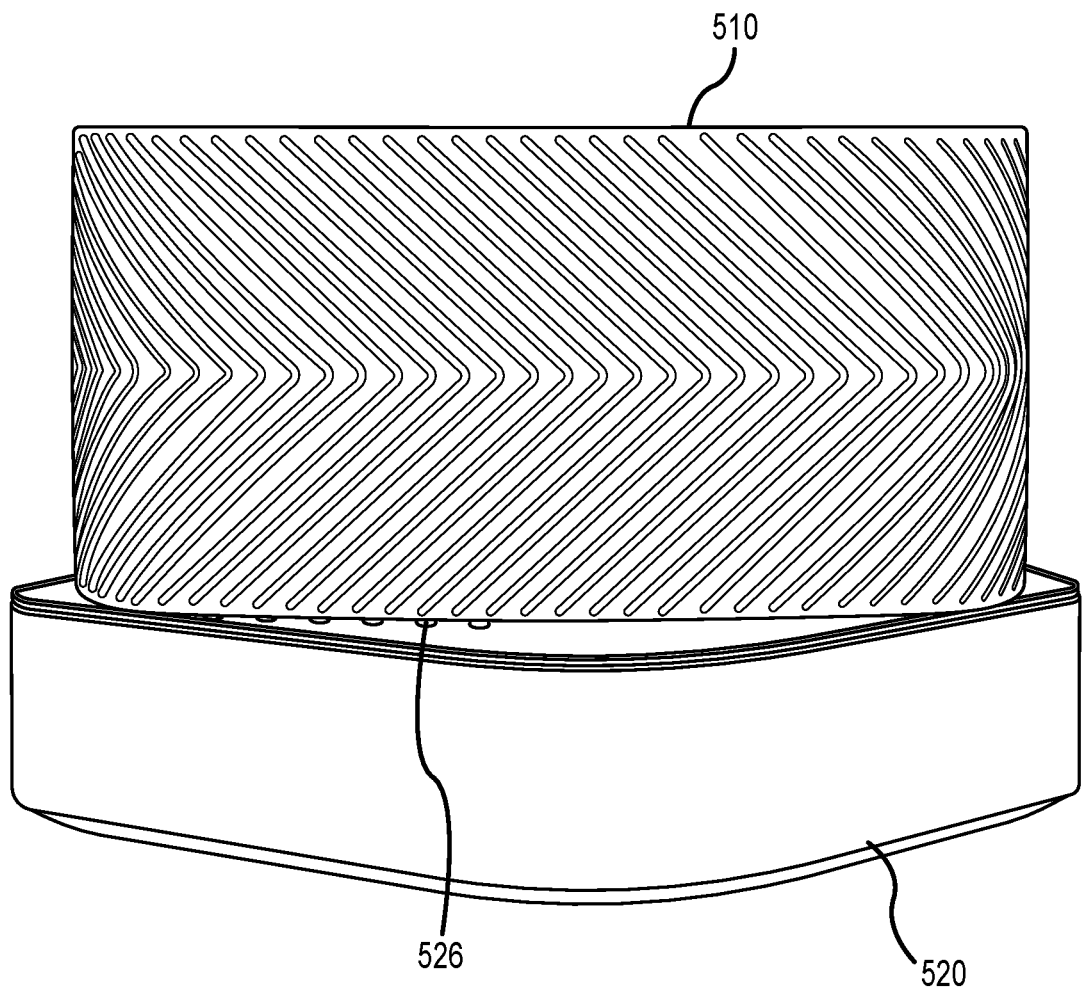
FIG. 7 illustrates a side view of the secondary module with the connection posts inserted into the receiving slots according to various embodiments.

Referring to FIG. 7, a side view of the secondary module 520 in the process of being coupled to the primary module 110 is illustrated according to various embodiments. The connection posts may be inserted into the receiving slots. The pins 526 may contact the mating surface and begin to compress within the secondary module 520.

Figure 8:
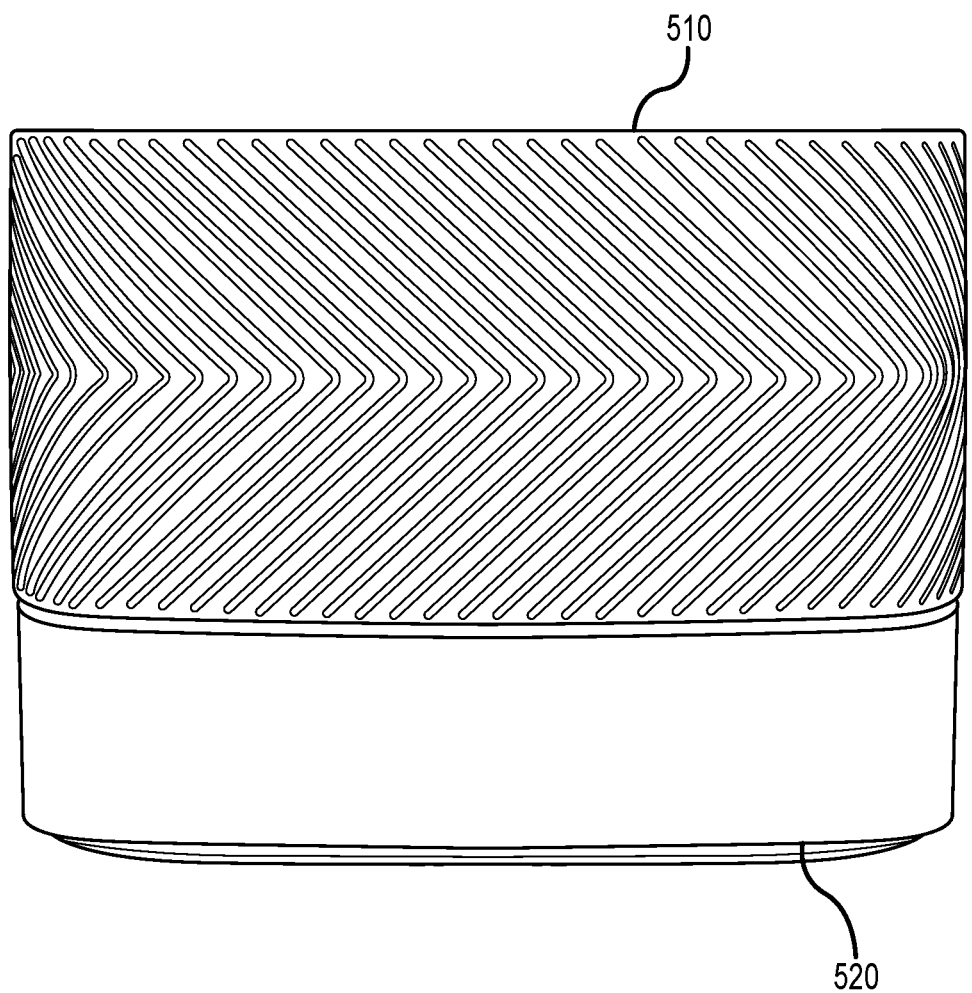
FIG. 8 illustrates a side view of the secondary module coupled to the primary module according to various embodiments.

Referring to FIG. 8, a side view of the secondary module 520 coupled to the primary module 110 is illustrated according to various embodiments. The connection posts may be located within the locking apertures, which may prevent the primary module 110 and secondary module 520 from separating without an intentional rotation of the secondary module 520 relative to the primary module 110. The pins may be located within the contact pad apertures and contact the contact pads. Thus, the secondary module 520 and the primary module 110 may be both electronically and mechanically coupled together.

Figure 9:
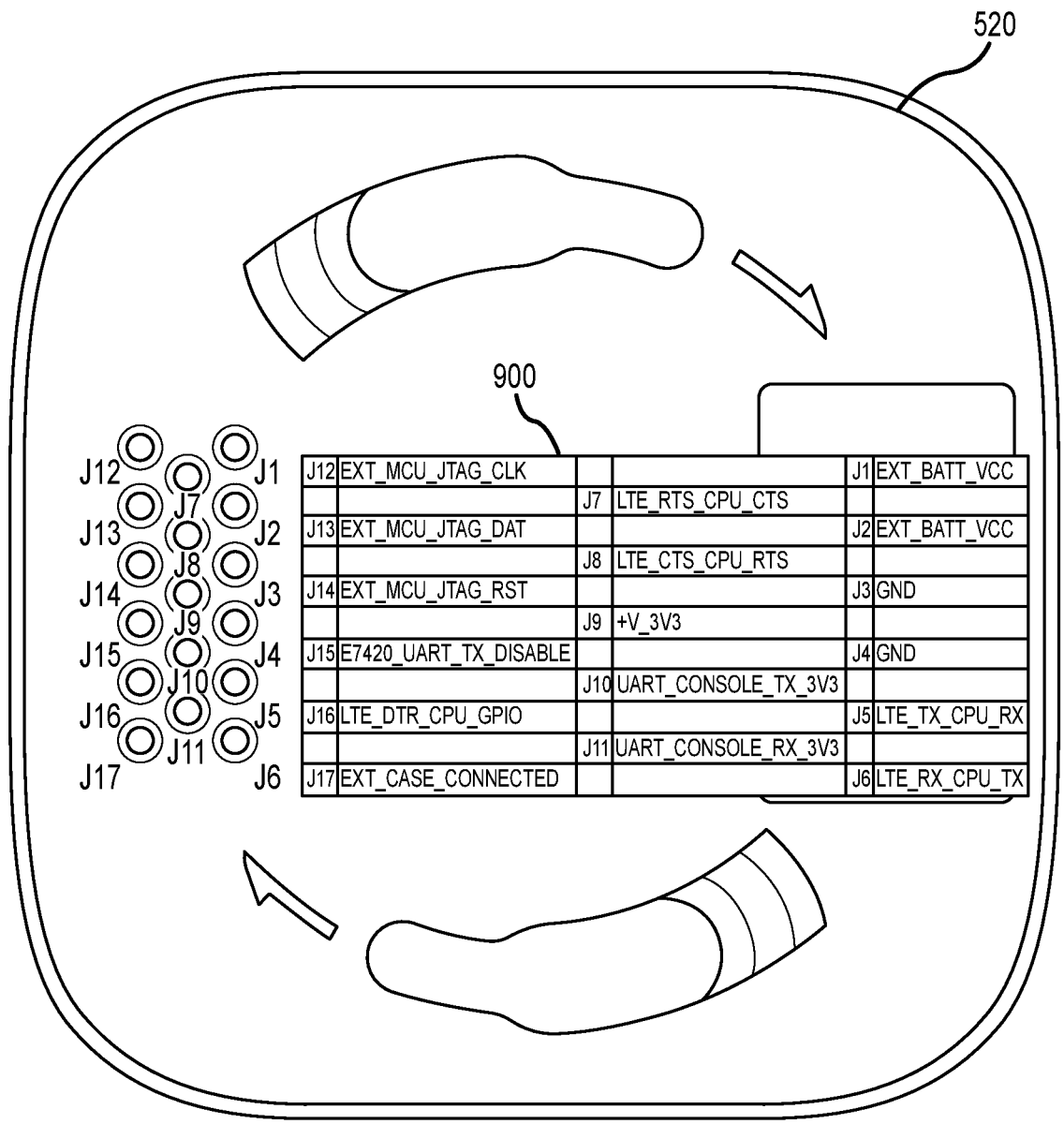
FIG. 9 illustrates a bottom view of the primary module including a pin diagram according to various embodiments.

Referring to FIG. 9, a bottom view of the primary module 110 including a pin diagram 900 is illustrated according to various embodiments. The pin diagram 900 describes the location and function of the pins and contact pads described with reference to FIGS. 1-8. As illustrated, the primary module 110 may comprise a first row of six contact pads J1, J2, J3, J4, J5, and J6. The primary module 110 may comprise a second row of five contact pads J7, J8, J9, J10, and J11. The primary module 110 may comprise a third row of six contact pads J12, J13, J14, J15, J16, and J17. The second row may be staggered from the first and third rows. The secondary modules may have seventeen corresponding pins. The contact pads J1 and J2 may connect to a power source, such as a 3.8VDC supply. The contact pads J3 and J4 may connect to ground. The contact pads J5, J6, J7, and J8 may be for LTE Universal Asynchronous Received Transmitter ("UART"). The contact pads J10 and J11 may provide UART access to main unit Micro Controller Unit ("MCU") or CPI to communicate with MCU/CPU without the need to open the main unit. The contact pads J12, J13, J14 provide a JTAG connection to the MCU that allows porting JTAG function to other elements in the primary module 110. The contact pad J15 allows the UART to talk to the MCU or CPU. The pad directs traffic to one or the other. The contact pad J16 provide LTE DTR signal to force LTE into a low power mode. The contact pad J17 may provide a signal to the primary module 110 indicating whether an external batter, LTE, or other accessory is attached.

Figure 10:
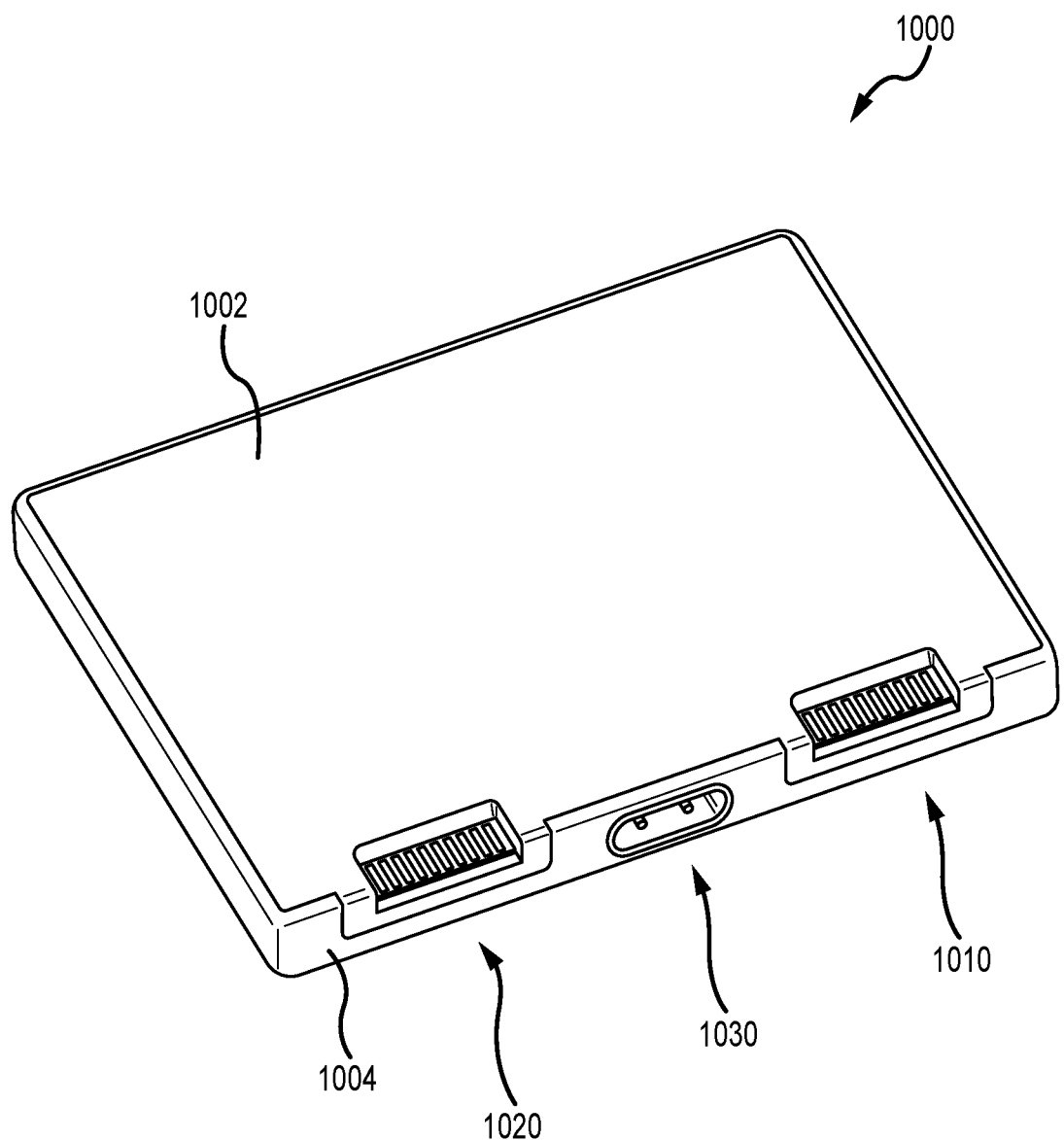
FIG. 10 illustrates a perspective view of a primary module comprising an edge pin configuration according to various embodiments.

Referring to FIG. 10, a perspective view of a primary module 1000 comprising an edge pin configuration is illustrated according to various embodiments. The primary module 1000 may perform similar or identical functions to the primary module 110 described with reference to FIGS. 1-9. The primary module 1000 may comprise computing components, such as a processor, hard drive, wireless chip, battery, etc. The primary module 1000 may generally comprise the shape of a rectangular cuboid, such that the primary module 1000 comprises six sides, each of which are rectangular. The primary module 1000 may comprise a first pin set 1010 and a second pin set 1020. The first pin set 1010 and the second pin set 1020 may be located at a junction between a top side 1002 and a front side 1004 of the primary module 1000. The first pin set 1010 and the second pin set 1020 may be configured to contact corresponding pins in a secondary module.

The primary module 1000 may further comprise a connection port 1030. The connection port 1030 may be configured to receive a cord to connect the primary module 1000 to other components, such as a computer, camera, printer, etc. In various embodiments, the connection port 1030 may be a USB Type C port, any other USB Type port, a serial port, or any other type of connection port capable of connecting to other devices. However, the USB Type C port allows the primary module to be constructed in a very thin package. For example, in various embodiments, a height of the primary module 1000 is less than 0.3 inches. In various embodiments, the connection port 1030 may be located on the front side 1004 of the primary module 1000 between the first pin set 1010 and the second pin set 1020.

Figure 11:
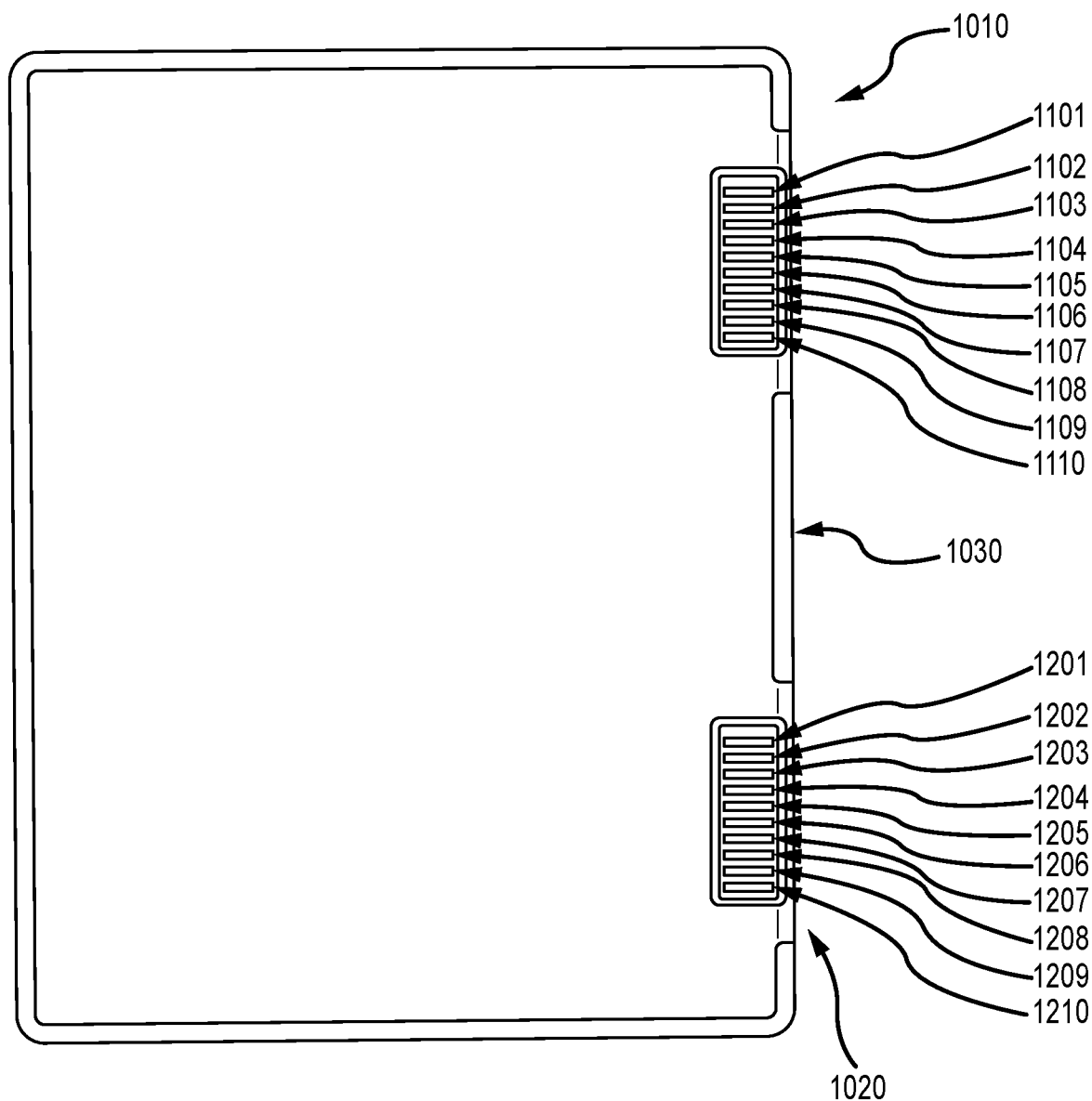
FIG. 11 illustrates a pin diagram of the primary module of FIG. 10, according to various embodiments.

Referring to FIG. 11, a pin diagram of the primary module 1000 is illustrated according to various embodiments. The first pin set 1010 may comprise a first pin 1101, a second pin 1102, a third pin 1103, a fourth pin 1104, a fifth pin 1105, a sixth pin 1106, a seventh pin 1107, an eighth pin 1108, a ninth pin 1109, and a tenth pin 1110. The second pin set 1020 may comprise a first pin 1201, a second pin 1202, a third pin 1203, a fourth pin 1204, a fifth pin 1205, a sixth pin 1206, a seventh pin 1207, an eighth pin 1208, a ninth pin 1209, and a tenth pin 1210.

For the first pin set 1010, the first pin 1101 may comprise a battery pack positive pin, the second pin 1102 may comprise a battery pack positive pin, the third pin 1103 may comprise a system ground pin, the fourth pin 1104 may comprises a USB 2.0 Data (+) pin, the fifth pin 1105, may comprise a USB 2.0 Data (−) pin, the sixth pin 1106 may comprise a system ground pin, the seventh pin 1107, may comprise a UART data receive pin, the eighth pin 1108 may comprise a UART data transmit pin, the ninth pin 1109 may comprise a system ground pin, and the tenth pin 1110 may comprise a system ground pin.

For the second pin set 1020, the first pin 1201 may comprise an external power positive pin, the second pin 1202 may comprise an external power positive pin, the third pin 1203 may comprise a battery pack temperature sensor pin, the fourth pin 1204 may comprise an on switch/signal (low) pin, the fifth pin 1205 may comprise a reset signal (low) pin, the sixth pin 1206 may comprise a mode select (low) pin, the seventh pin 1207 may comprise a serial com data pin, the eighth pin 1208 may comprise a serial com clock pin, the ninth pin 1209 may comprise a system ground pin, and the tenth pin 1210 may comprise a system ground pin.

Figure 12:
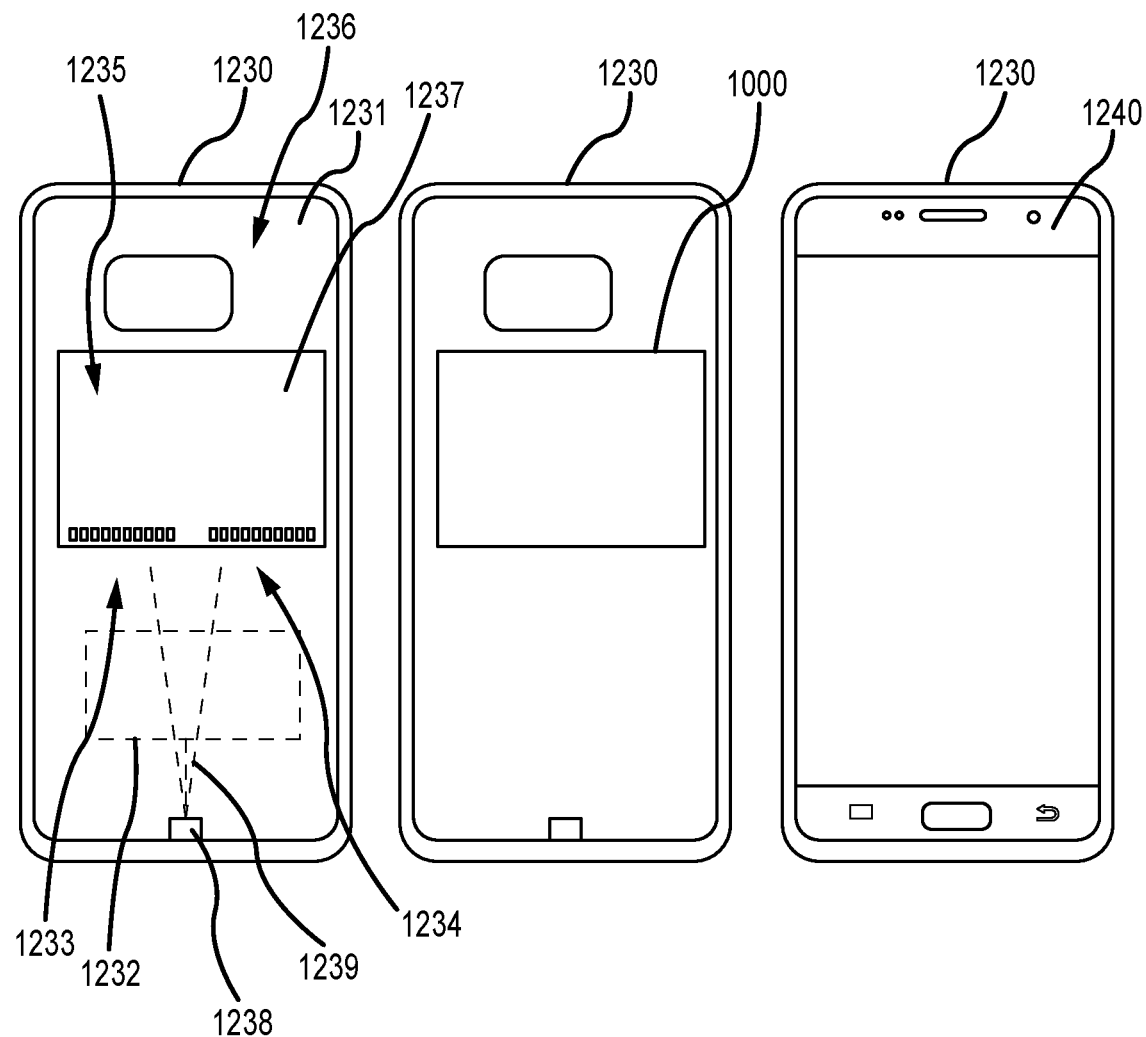
FIG. 12 illustrates a phone case with a primary module and a phone, according to various embodiments.

Referring to FIG. 12, a phone case 1230, the phone case 1230 with the primary module 1000 installed in the phone case 1230, and a phone 1240 installed in the phone case 1230 are illustrated according to various embodiments. The phone case 1230 may function as a secondary module to the primary module 1000. The phone case 1230 may be manufactured to the desired dimensions in order to fit any particular phone model. The phone case 1230 may comprise a housing 1231, with a battery 1232 located within the housing. In various embodiments, the battery 1232 may be permanently encapsulated within the housing 1231. However, in various embodiments, the battery 1232 may be removable from the phone case 1230.

The phone case 1230 may comprise a first pin set 1233 and a second pin set 1234. The first pin set 1233 and the second pin set 1234 may be configured to interface with the pins on the primary module 1000. In various embodiments, the first pin set 1233 and the second pin set 1234 on the phone case 1230 may be male pins, and the pins on the primary module 1000 may be female pins. In various embodiments, the pins on the primary module 1000 may be male pins, and the first pin set 1233 and the second pin set 1234 may be female pins.

The phone case 1230 may comprise a module reception cavity 1235. The module reception cavity 1235 may be configured to receive the primary module 1000. The module reception cavity 1235 may comprise the same size and shape as the primary module 1000. The phone case 1230 may further comprise a phone reception cavity 1236 which is configured to receive the phone 1240. The module reception cavity 1235 may comprise a back wall 1237 which is configure to keep the primary module 1000 within place between the back wall 1237 and the phone 1240 when the phone 1240 is inserted within the phone reception cavity 1236.

The phone case 1230 may comprise a phone jack 1238. The phone jack 1238 may be configured to electrically connect the battery 1232 and/or primary module 1000 to the phone 1240 via a connection port in the phone 1240. The connection port may be a standard port typically used to charge and transfer data to/from the phone 1240. The phone case 1230 may comprise internal wires 1239 which connect the primary module 1000, the battery 1232, and the phone jack 1238.

Figure 13:
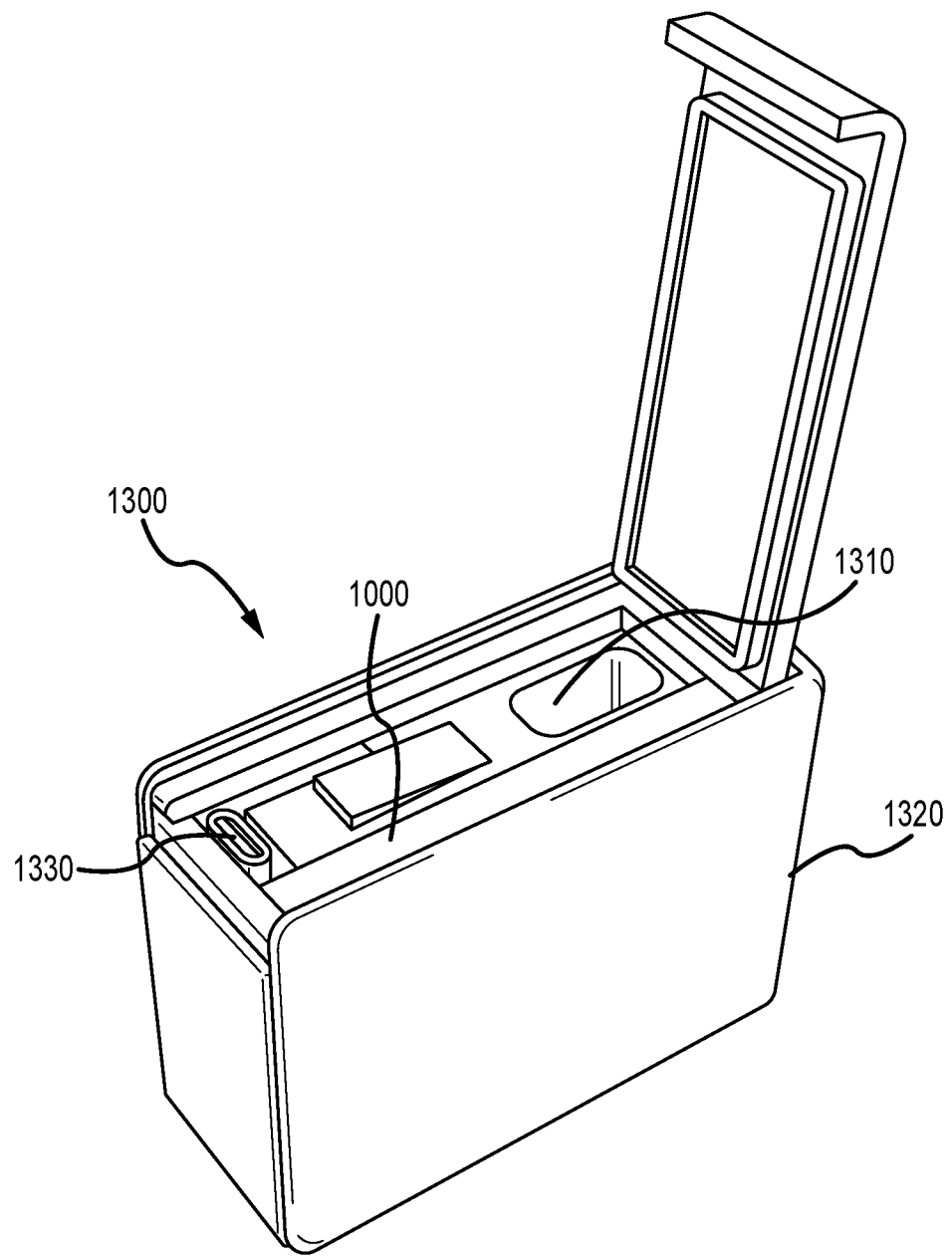
FIG. 13 illustrates a secondary module comprising a battery, according to various embodiments.

Referring to FIG. 13, the primary module 1000 is shown inserted in a secondary module 1300 comprising a battery 1310. The secondary module 1300 may comprise a housing 1320 which may enclose the primary module 1000 and the battery 1310. The secondary module 1300 may comprise a first reception cavity configured to receive the primary module 1000, and a second reception cavity configured to receive the battery 1310. In various embodiments, the battery 1310 may be permanently installed within the housing 1320, or the battery 1310 may be removably installed in the housing 1320. The secondary module 1300 may comprise a connection port 1330, such as a USB Type C port, which allows the secondary module 1300 to electrically connect to a power source (e.g. outlet) to charge the battery 1310 or transfer data to other components, such as computers, using a cord. The battery 1310 may provide power to the primary module 1000 when the primary module 1000 is installed within the secondary module 1300. The secondary module 1300 may also comprise pins configured to mate with the pins previously described on the primary module 1000, and/or the secondary module 1300 may comprise wires which electrically connect the primary module 1000, the battery 1310, and the connection port 1330.

As described with reference to FIGS. 1-9, the primary module 1000 may be capable of wirelessly communicating with other devices. However, in various embodiments, the primary module 1000 may be able to transfer and receive data faster using a wired connection than a wireless connection. Thus, by electrically connecting the primary module 1000 to the phone as shown in FIG. 12, or by electrically connecting the primary module 1000 to an external device using a cable as describe in FIG. 13, the primary module 1000 may be able to more quickly transfer and receive data.

Those skilled in the art will recognize that various pin configurations may be utilized. Additionally, although only two secondary modules have been illustrated, many different sizes, shapes, and functions of secondary modules may couple to the primary module. Although the illustrated embodiments comprise connection posts and pins on the secondary modules, in various embodiments, the connection posts and/or the pins may be located on the primary module, and the receiving slots and/or contact pads may be located on the secondary modules.

The terms "computer program medium" and "computer usable medium" are used to generally refer to media such as removable storage drive and a hard disk installed in hard disk drive. These computer program products provide software to the PED.

In various embodiments, software may be stored in a computer program product and loaded into the PED using removable storage drive, hard disk drive or communications interface. The control logic (software), when executed by the processor, causes the processor to perform the functions of various embodiments as described herein. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A modular portable electronic device system comprising:
    a primary module comprising a processor, a hard drive, a wireless chip, a battery, and a mating surface comprising a receiving slot;
    a first secondary module comprising a first connection post, wherein the first secondary module is configured to couple to the primary module by inserting the first connection post in the receiving slot and rotating the first secondary module; and
    a second secondary module comprising a second connection post, wherein the second secondary module is configured to couple to the primary module by inserting the second connection post in the receiving slot and rotating the second secondary module;
    wherein the primary module comprises seventeen contact pads.

2. The modular portable electronic device system of claim 1, wherein the first secondary module comprises a cover plate, and wherein the second secondary module comprises a storage module.

3. The modular portable electronic device system of claim 1, wherein the seventeen contact pads are arranged in a first row of six contact pads, a second row of five contact pads, and a third row of six contact pads.

4. The modular portable electronic device system of claim 1, wherein the receiving slot comprises a ramp extending from the mating surface to a recessed surface.

* * * * *